(12) United States Patent
Kim

(10) Patent No.: US 8,689,883 B2
(45) Date of Patent: Apr. 8, 2014

(54) ADJUSTABLE VENTURI VALVE

(75) Inventor: Namhyo Kim, Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 957 days.

(21) Appl. No.: 11/359,071

(22) Filed: Feb. 22, 2006

(65) Prior Publication Data
US 2007/0193752 A1   Aug. 23, 2007

(51) Int. Cl.
*E21B 34/06* (2006.01)
*E21B 43/12* (2006.01)
*E21B 34/14* (2006.01)

(52) U.S. Cl.
CPC ............ *E21B 43/123* (2013.01); *E21B 34/14* (2013.01)
USPC .......................... 166/372; 166/386; 166/332.1

(58) Field of Classification Search
USPC ............... 166/372, 386, 54, 332.1, 334.1; 137/155; 251/123, 124
See application file for complete search history.

(56) References Cited

U.S. PATENT DOCUMENTS

| | | | | |
|---|---|---|---|---|
| 2,173,022 A | * | 9/1939 | Mitchell | 138/46 |
| 2,323,893 A | * | 7/1943 | Boynton | 137/155 |
| 2,601,654 A | * | 6/1952 | Wright | 137/515 |
| 3,342,203 A | * | 9/1967 | Abercrombie | 137/155 |
| 3,848,806 A | * | 11/1974 | Samuelsen et al. | 239/265.11 |
| 3,873,238 A | * | 3/1975 | Elfarr | 417/54 |
| 4,087,207 A |  | 5/1978 | Chappell et al. | |
| 5,141,062 A | * | 8/1992 | Anderson | 175/234 |
| 5,501,280 A | * | 3/1996 | Brisco | 166/373 |
| 5,535,828 A | * | 7/1996 | der Kinderen et al. | 166/372 |
| 5,707,214 A | * | 1/1998 | Schmidt | 417/109 |
| 5,743,717 A |  | 4/1998 | Schmidt | |
| 5,752,570 A | * | 5/1998 | Shaposhnikov et al. | 166/372 |
| 6,250,602 B1 | * | 6/2001 | Jansen | 251/129.11 |
| 6,568,473 B2 | * | 5/2003 | de Almeida | 166/250.15 |
| 6,708,763 B2 |  | 3/2004 | Howard et al. | |
| 6,715,550 B2 | * | 4/2004 | Vinegar et al. | 166/250.15 |
| 6,748,932 B1 | * | 6/2004 | Sorter et al. | 123/527 |
| 2004/0182437 A1 | * | 9/2004 | Messick | 137/155 |
| 2005/0199840 A1 | * | 9/2005 | Brinks et al. | 251/124 |
| 2006/0076145 A1 | * | 4/2006 | Lembcke et al. | 166/372 |

FOREIGN PATENT DOCUMENTS

| | | |
|---|---|---|
| EP | 1574764 | 9/2005 |
| GB | 1 538 249 | 1/1979 |
| GB | 2 391 057 | 1/2004 |

OTHER PUBLICATIONS

GB Search Report, Application No. GB 0702939.0, dated Jun. 14, 2007.
GB Search Report, Application No. GB0702939.0, dated Nov. 27, 2007.
GB Search Report, Application No. GB0702939.0, dated Nov. 28, 2007.

(Continued)

*Primary Examiner* — Cathleen Hutchins
(74) *Attorney, Agent, or Firm* — Patterson & Sheridan, L.L.P.

(57) ABSTRACT

A gas-handling valve for use in the application where adjustable maximum critical flow rate is required. The valve is a venturi valve and has an annular flow path formed between a housing and a plug. The plug and housing are movable relative to each other to form at least two different throat dimensions in the valve. In one aspect, the throat diversion of the valve is self adjusting. In another aspect, the valve is usable in a gas lift or steam injection well.

7 Claims, 7 Drawing Sheets

(56) References Cited

OTHER PUBLICATIONS

Canadian Office Action for Application No. 2,578,501 dated Jul. 7, 2008.
Fairuzov et al.—"Effect of Operating Valve Performance on Stability of Gas Lift Wells," SPE 97275, presented at the 2005 SPE Annual Technical Conference and Exhibition held in Dallas, Texas, Oct. 9-12, 2005, pp. 1-7.
Jansen et al.—"Automatic Control of Unstable Gas Lifted Wells," SPE 56832, prepared for presentation at the 1999 SPE Annual Technical Conference and Exhibition held in Houston, Texas, Oct. 3-6, 1999, 13 pages.
Lyons et al.—*Standard Handbook of Petroleum & Natural Gas Engineering*, Second Edition, Gulf Professional Publishing / Elsevier Inc., Burlington, Massachusetts, 2005, pp. 6-149-6-165.
O'Keefe Controls Co., "Choked Flow of Gases," O'Keefe Tutorial, 2000, 4 pages.
Schlumberger Limited—"NOVA Orifice Venturi Valves," Schlumberger brochure, 2008, 3 pages.
Tokar et al.—"New Gas Lift Valve Design Stabilizes Injection Rates: Case Studies," SPE 36597, prepared for presentation at the 1996 SPE Annual Technical Conference and Exhibition held in Denver, Colorado, Oct. 6-9, 1996, pp. 235-248.
Canadian Office Action, Application No. 2,578,501, dated Apr. 3, 2009.
GB Examination Report for GB0702939.0 dated May 28, 2010.

* cited by examiner

ADJUSTABLE VENTURI VALVE

BACKGROUND OF THE INVENTION

1. Field of the Invention

The present invention relates to valves for use in oil and gas wells as well as other surface flow controls. More particularly, the invention relates to a critical flow valve that provides an annular flow path for gas or other compressible fluid medium and has adjustable throat area to increase or decrease the critical volume rate of gas flowing through the valve due to relative changes of the throat area. The throat area may either be adjustable automatically or manually depending on the purpose of utilization of the valve.

2. Description of the Related Art

The area of application of the present invention is not limited to the recovery of hydrocarbon fluids, but some typical embodiments are chosen in terms of oilfield application for example.

To obtain hydrocarbon fluids from an earth formation, a wellbore is drilled into the earth to intersect an area of interest within a formation. The wellbore may then be "completed" by inserting casing within the wellbore and setting the casing therein using cement. In the alternative, the wellbore may remain uncased (an "open hole" wellbore), or may be only partially cased. Regardless of the form of the wellbore, production tubing is typically run into the wellbore primarily to convey production fluid (e.g., hydrocarbon fluid, which may also include water and gas) from the area of interest within the wellbore to the surface of the wellbore. In an alternative, the annulus formed by tubing and casing may be used as the production stream.

Often, pressure within the wellbore is insufficient to cause the production fluid to naturally rise through the production string to the surface of the wellbore. Thus, to carry the production fluid from the area of interest within the wellbore to the surface of the wellbore, artificial lift means is sometimes necessary. Gas lift and steam injection are examples of artificial lift means for increasing production of oil and gas from a wellbore.

Gas lift systems are often the preferred artificial lifting systems because fewer moving parts exist during the operation of the gas lift systems than during the operation of other types of artificial lift systems, like sucker rod lift systems. Moreover, because no sucker rod is required to operate the gas lift system, gas lift systems are usable in offshore wells having subsurface safety valves that would interfere with a sucker rod.

Figure 1:
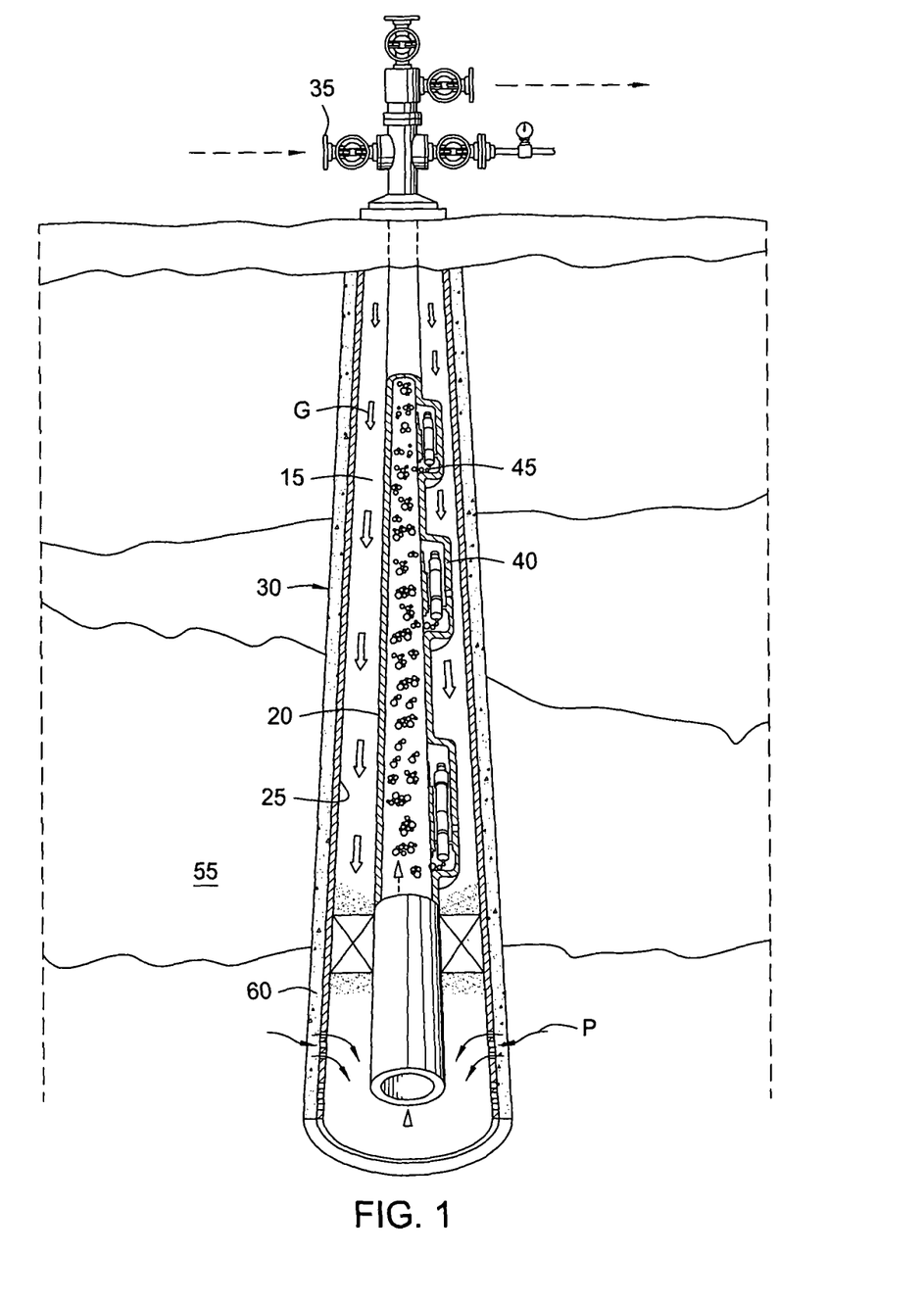
FIG. 1 is a section view of a gas injection wellbore.

FIG. 1 is illustrative of a gas lift operation producing production fluid through tubing while the injection gas flows through an annulus formed between tubing and casing. In other applications, the gas may be injected through tubing while the production stream flows through the annulus. Production fluid P flows from formation 55 into wellbore 30 through perforations 60 formed in casing 25. From the wellbore, the production fluid P flows into the production tubing 20 and to a wellhead 35 for collection. When it is desired to lift the production fluid P with gas G, compressed gas G is introduced into the annulus 15. Any of the gas lift valves 45 which are in the open position allow the gas G to flow into the production tubing 20 through an opening in the gas lift mandrel 40 to lift the production fluid P to the surface of the wellbore 30.

Gas lift valves typically include a restriction that is intended to control the flow of gas entering the production string. Choked flow or "critical" flow relates to a condition in which the flow of gas through a nozzle reaches its maximum flow rate with the local flow velocity equivalent to the speed of sound (sonic velocity) at the throat. At that point and over some range of pressure differentials between the near upstream and downstream of the valve, the flow rate of gas will remain stable and unchanged in spite of variances in the relative pressure. For example, for the simple orifice nozzle valve, the flow rate will be stable and limited once an absolute pressure ratio is less than 0.528. In more practical terms, a volume of gas passing through a valve at critical flow will not be so affected by pressure variations between the upstream and downstream sides of the valve. The disadvantage of using a simple orifice nozzle valve is that the pressure ratio across the valve is well above the required critical pressure ratio, and therefore the critical flow condition is unlikely to occur for usual gas lift operation.

More recently, gas lift valves have included a venturi in place of a simple orifice. A typical venturi includes an inlet portion, a throat portion and a diffuser portion. With a venturi, losses of energy in injection gas flow are significantly smaller and a significant pressure recovery occurs along the diffuser of the venturi. As a consequence, the critical flow condition is easily achievable at the pressure ratio of 0.9 or lower keeping a constant flow rate through the valve for fluctuating pressure environment.

U.S. Pat. No. 6,568,473 teaches a venturi with an annular flow area formed between the interior of a valve housing and an exterior of a plug. The '473 patent is incorporated by reference in its entirety herein. Like a more typical venturi, the annular flow path includes an inlet, throat and diffuser portion. In the '473 patent, the plug portion is movable relative to the housing portion in order to close the valve in the event the flow of injection gas does not have enough pressure to overcome the combined force from valve spring and production fluid pressure.

While the '473 patent provides an effective venturi design, it falls short of solving some of the continuing problems associated with gas lift valves. One of the problems is "heading". Heading is a periodic and unstable flow phenomenon in both the production stream and gas injection sides leading to a dramatic reduction of fluid production and excessive injection gas consumption. Heading occurs when a pressure differential between the injection gas and the production fluid changes due to a transient fluctuation in well conditions. This temporary change of production pressure may come about as a result of an increase in a production gas/oil ratio in the well. For example, as the percentage of gas entering the production string from the well increases, the hydrostatic pressure in the production stream decreases. This temporary pressure fluctuation can create an unstable heading phenomena. For most cases, the un-choked simple orifice nozzles respond in an adverse manner by injecting more gas. On the other hand, the choked venturi nozzles of fixed geometry may inject the unchanged gas volume so long as the pressure differential is within a choked flow regime. However, to most effectively operate a gas lift system, the volume of gas injected from the injection side should be decreased in an equal amount to compensate for the increment of production gas in the production string. However, with a venturi of fixed geometry, the only efficient way to decrease the volume of gas entering the (production string) from the injection side is to reduce the throat dimensions of the valve. In current designs, changing the throat dimensions would mean removing the valve from the well and replacing it.

The opposite situation can also occur wherein the flow of gas into the tubing from the well deceases. To most efficiently operate the well in this instance, the volume of gas injected should be increased. However, as with the opposite scenario, increasing gas flow across a critical flow valve is impractical without changing the valve for one with a larger throat dimension.

Like gas lift, steam injection methods are known to increase the natural flow of production from a wellbore. In a steam injection scenario, wellbore(s) are created adjacent to or near a producing wellbore and steam is injected into these wellbores and permitted to exit and flow into a surrounding formation to heat hydrocarbons and urge them towards a nearby, producing wellbore. Venturi valves are commonly used in injection wells to maximize and stabilize the amount of steam injected from a tubing string into a formation. However, rather than controlling the volume of gas flowing from the annulus to the tubing string, the venturi valves in injection wells are used to control flow from the tubing to the annulus. Methods and apparatus for operating injection wells are taught in U.S. Pat. No. 6,708,763 owned by the assignee of the present application and that patent is incorporated herein in its entirety. Steam injection wells using venturi valves have the same limitations as gas lift wells in that the venturi is sized to permit a given volume of steam at a critical flow rate and increasing or decreasing that volume is impractical without changing the entire valve. There are times when an operator would like to increase or decrease the volume of steam delivered from a wellbore to a formation depending upon changes in natural conditions. The present arrangements make that impractical without changing equipment in the wellbore.

A need exists therefore for a critical flow valve which provides a simple way to increase or decrease gas or steam volume through the valve while maintaining a critical flow rate. A further need exists for a critical flow valve which is adjustable in order to adjust the size of the throat area of the valve. A further need exists for a venturi valve which includes an annular flow area defined by portions of plug and housing which are movable relative to each other between at least two positions, either position providing a different throat geometry.

SUMMARY OF THE INVENTION

The present invention generally relates to a gas-handling valve for use in the application where adjustable maximum critical flow rate is required. The valve is a venturi valve and has an annular flow path formed between a housing and a plug. The plug and housing are movable relative to each other to form at least two different throat dimensions in the valve. In one aspect, the throat diversion of the valve is self adjusting. In another aspect, the valve is usable in a gas lift or steam injection well.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 2A:
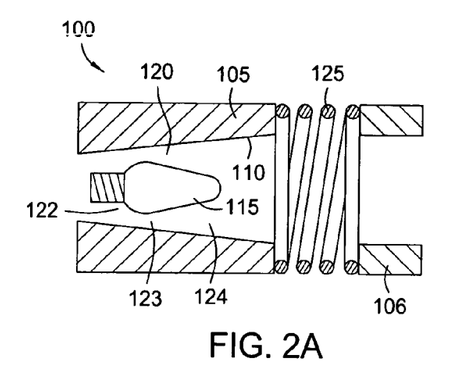
FIGS. 2A-C illustrate one embodiment of the invention, primarily for a gas lift application, wherein a housing portion is movable relative to a plug portion of a venturi valve.
Figure 2B:
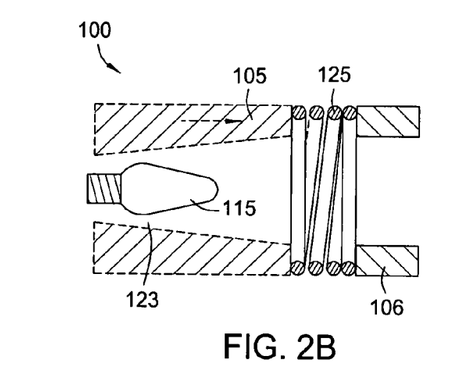
Figure 2C:
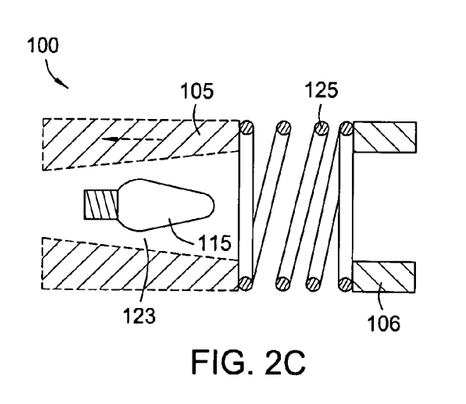

The area of application of the present invention is not limited to the recovery of hydrocarbon fluids, but some typical embodiments are chosen in terms of oilfield application, especially for gas lift and steam injection, for illustrative purposes. FIGS. 2A-C illustrate one embodiment of the invention primarily for a gas lift application wherein a housing portion is movable relative to a plug portion of a venturi valve. The valve 100 provides a venturi having a housing 105 with an inner, tapered surface 110 formed in an inner bore. Within the housing is a plug portion 115 and an annular flow path 120 is formed between the plug 115 and housing 105. The annular path forms an inlet 122, a throat 123 and a diffuser portion 124. In the embodiment of FIGS. 2A-C the inside surface of the housing tapers 110 from an initially small inner diameter to a relatively larger inner diameter. In the Figures, a side of the valve exposed to the gas injection is the left side and the production side is the right side. Injected gas therefore moves through the valve from left to right. As is evident from a comparison of FIGS. 2A through C, the housing 105 is spring mounted relative to the plug 115 with a spring 125 separating the housing 105 from a base portion 106 of the housing. While a spring is used in the preferred embodiment of FIGS. 2A-C, the spring is only one type of biasing device usable to change the position of one component relative to another. A bellows device, for example, could perform the same function. FIG. 2A illustrates the valve in a "neutral" position. The valve is intended to remain in the neutral position under ordinary operating circumstances. In a gas lift valve, ordinary circumstances would mean a somewhat higher pressure on the gas injection (left) side of the valve as injected gas from the surface of the well is forced through the valve and into the production side. Therefore, in the neutral position, the spring 125 and fluid dynamic forces are in balance at a particular design condition.

FIG. 2B shows an automatic valve operation that is intended to compensate for a decrease in pressure on the production side (the right side) of the valve 100. The decrease typically comes about due to an increase in gas produced by the well. For example, if the gas component of an oil/gas mixture increases, the pressure in the production side will be reduced due to the smaller percentage of fluid adding to a hydrostatic head in the production string. In this instance, the valve of the invention is designed to reconfigure itself to reduce the volume of gas injected at a critical flow rate into the well. The valve 100, with its spring mounted housing 105 is designed at a particular pressure differential to reconfigure itself to the position seen in FIG. 2B. The result is a valve with a smaller throat area 123. The smaller throat permits the valve to pass a reduced volume of gas, a decrease that would typically not be possible with a fixed throat while maintaining a critical flow across the valve.

The embodiment shown in FIG. 2C is primarily designed for a reverse situation from the one discussed with respect to FIG. 2B. The embodiment of FIG. 2C is for a situation where the production pressure has increased, indicating a decrease in gas production from the well. To address this situation the valve reconfigures itself to permit an increased volume of injection gas to enter the production string. In FIG. 2C, the housing of the valve has moved to extend the spring and in doing so has increased the throat 123 of the valve. The movement of the housing against the spring is brought about by a pressure differential across the valve, the pressure being increased on the production side of the valve due to the increased liquid portion creating an increased hydrostatic head.

In a preferred embodiment shown in the Figures, the inner surface of the housing is tapered in a linear fashion. However, the surface could be non-linear or even undulating to provide a particular throat dimension as the housing moves relative to the plug. Also, while the plug is circumferential and the flow path symmetrical in the embodiments shown, the flow path could be a variety of non-circumferential shapes depending upon the shape of the plug and housing. In one possible design, for example, a "slot-shaped" annular path is formed due to an elongation of the plug in one dimension with a corresponding and matching shape of the housing.

Figure 3A:
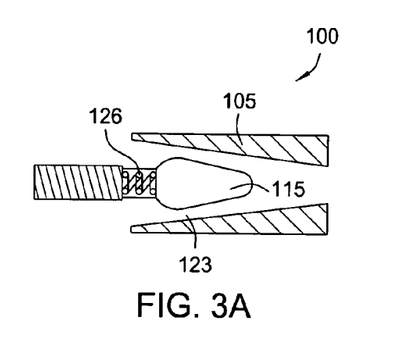
FIGS. 3A-C illustrate an alternative arrangement of the valve of FIGS. 2A-C, wherein the plug portion of the valve is movable relative to a housing portion.
Figure 3B:
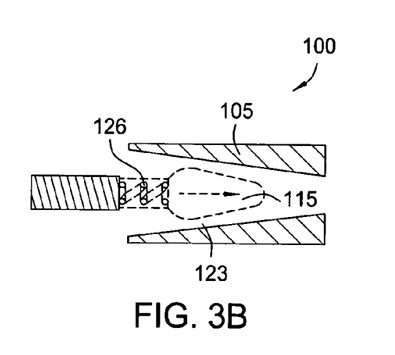
Figure 3C:
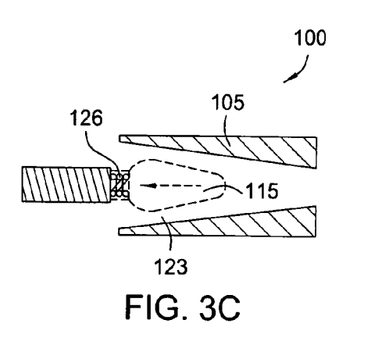

FIGS. 3A-C illustrate a different embodiment of the invention, but one that is intended to provide the same result as the configurations of FIGS. 2A-C. In FIGS. 3A-C, the plug portion 105 of the valve is mounted on a spring 126 and is movable relative to the housing 105. The inner wall of the housing is tapered in an opposing manner to the inner wall of the valve of FIGS. 2A-C in order to accomplish the same result using a spring loaded plug. FIG. 3A shows the valve in its neutral position where it will remain as injected gas from the surface of the well is forced through the valve and into the production (right) side. FIGS. 3B and 3C show the valve in an arrangement with a smaller and larger throat portion 123 respectively, due to a shifting of the plug portion 115 relative to the housing 105. For example, in FIG. 3B the plug portion 115 has moved inwards into the tapered housing 105 to reduce the effective throat 123 dimension and in FIG. 3C the plug has been urged outwards relative to the housing to increase the throat.

Figure 4A:
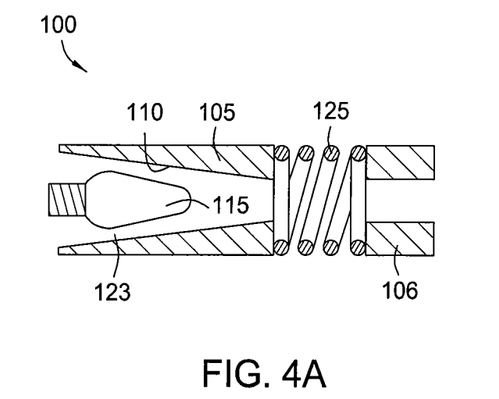
FIGS. 4A-C illustrate another embodiment of the invention, primarily for injection wells, wherein a housing portion is movable relative to a plug portion of a venturi valve.

FIGS. 4A-5C show an alternative embodiment of the invention designed primarily for use in steam injection wells. The design of the steam injection valve is in some respects reversed from the design used in connection with the embodiments of FIGS. 2A-3C. For example, in FIGS. 4A-5C, the injection side is the left side and the lower pressure wellbore side is the right side. Like the previous embodiments, the valve 100 shown in FIG. 4A includes a housing portion 105 mounted on a spring 125 and having a tapered inner surface 110 movable relative to a plug portion 115. An annular flow path 122 is formed between the outer surface of the plug 115 and the inner surface 110 of the housing 105. More specifically, a throat portion 123 of the valve 100 is formed between the plug 115 and an adjacent inner diameter of the housing 105. In FIG. 4A, the force of spring 125 is in balance with fluid dynamic forces and the valve is in a neutral position. As illustrated in FIG. 4B, the housing 105 is movable to a second position when the spring 125 is overcome by increased pressure force. The second position provides a throat 123 dimension which is larger in area than the throat 123 of the valve in the first position of FIG. 4A. FIG. 4B is a position assumed by the valve in the event the supply pressure of steam in the injection side is increased. If an operator chooses to increase the supply pressure of steam, the flow rate of steam through the valve and ultimately, into the area surrounding the wellbore will be increased. FIG. 4C shows a position taken by the valve in the event steam pressure from the injection side is decreased. The pressure differential across the valve will cause the spring loaded housing 105 to move towards the injection side and the throat 123 of the valve 100 will be decreased.

Figure 4B:
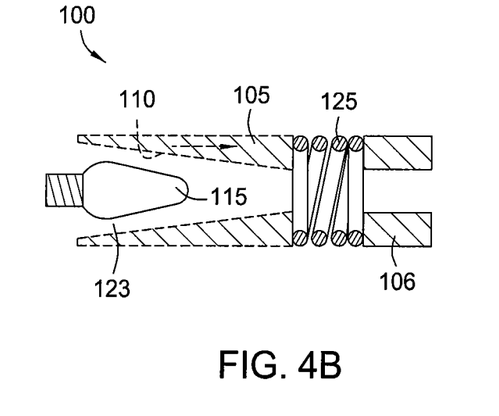
Figure 4C:
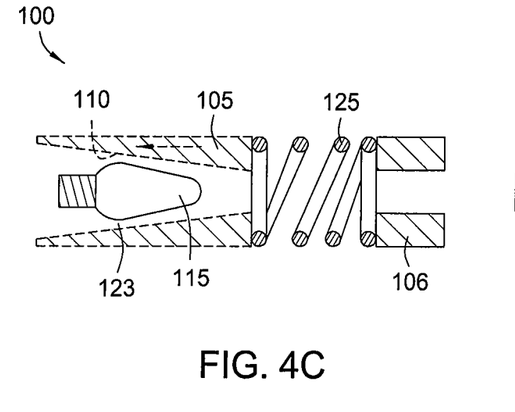
Figure 5A:
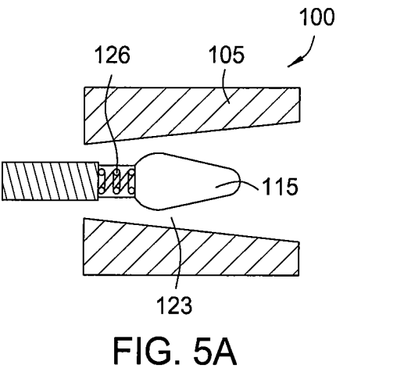
FIGS. 5A-C illustrate an alternative arrangement of the valve of FIGS. 4A-C, wherein the plug portion of the valve is movable relative to a housing portion.
Figure 5B:
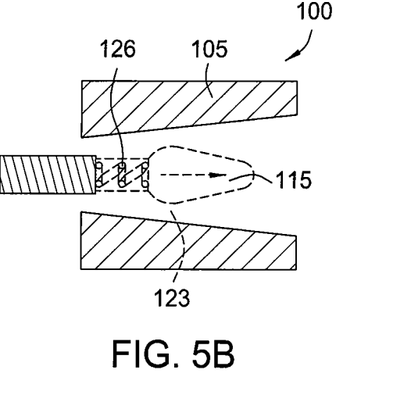
Figure 5C:
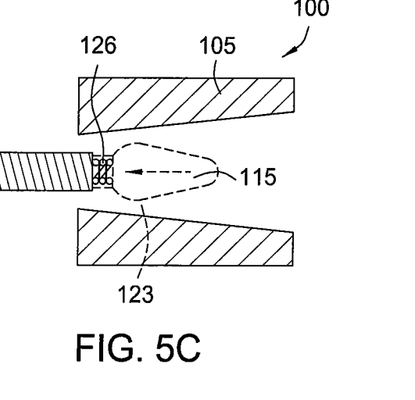

The embodiment of FIGS. 5A-C are designs intended to accomplish the same results as the embodiments of FIGS. 4A-C. However, in 5A-C the plug portion 115 of the valve is spring loaded and the plug portion moves relative to the tapered inner housing wall 110 to increase or increase the size of the throat 123 of the valve 100.

Figure 6:
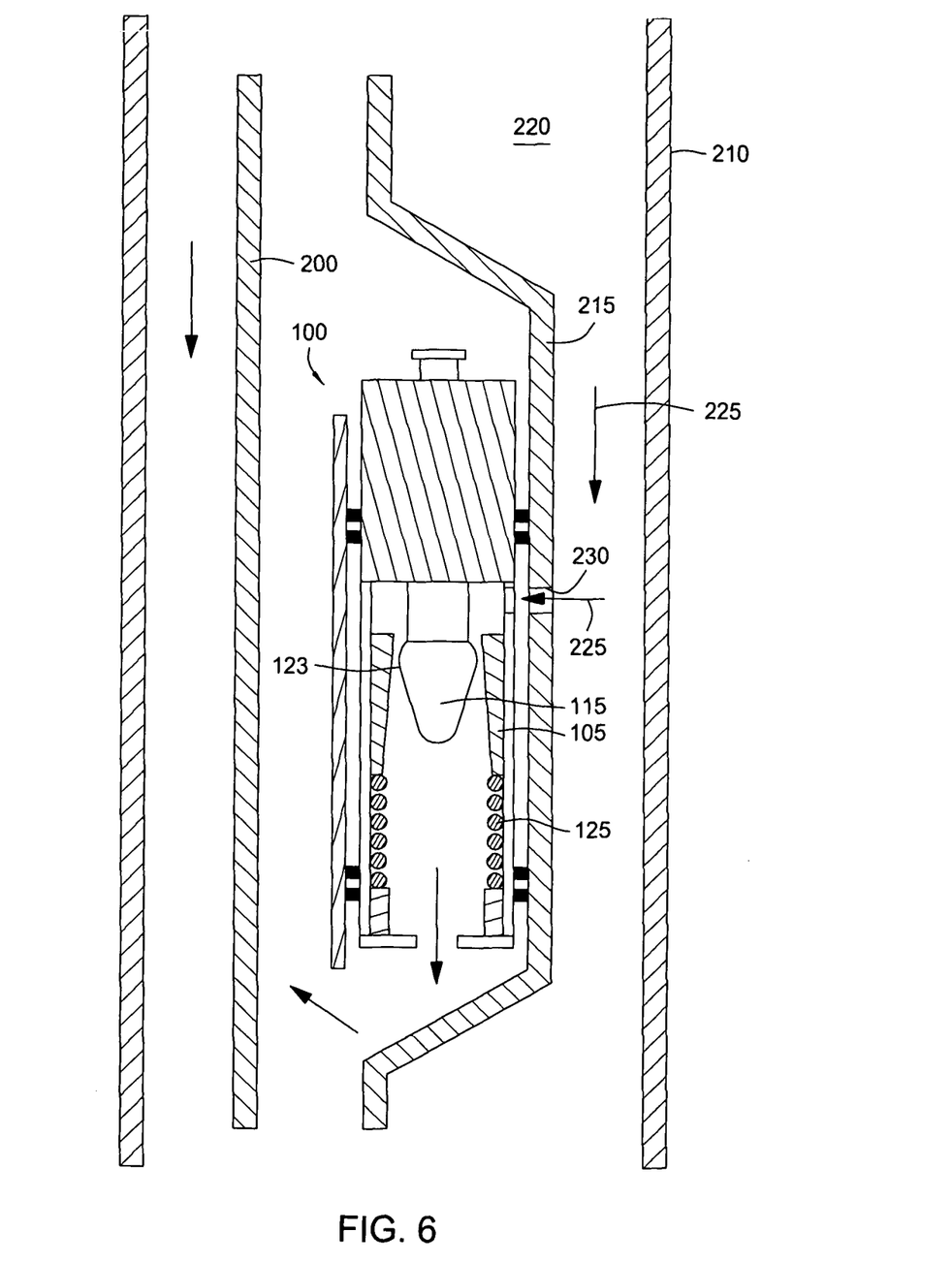
FIG. 6 is a section view of a venturi valve of the present invention installed in a gas lift mandrel.

FIG. 6 shows one embodiment of the invention installed in a gas lift well with production tubing 200 and casing 210. In the example of FIG. 6, the valve 100 is installed in a side pocket mandrel 215 which extends into an annulus 220 formed between the outer surface of the tubing 200 and the inner surface of the casing 210. As shown by the arrows 225, pressurized gas enters a port 230 in the side pocket mandrel and flows through the valve 100, exiting the valve and entering the tubing 200 to mix with production fluid and help raise it to the surface for collection. In FIG. 6, the valve is shown in its neutral position corresponding to FIG. 2A. From this position, a throat 123 of the valve can either be increased or decreased depending upon the location of the spring loaded housing relative to the plug.

Figure 7A:
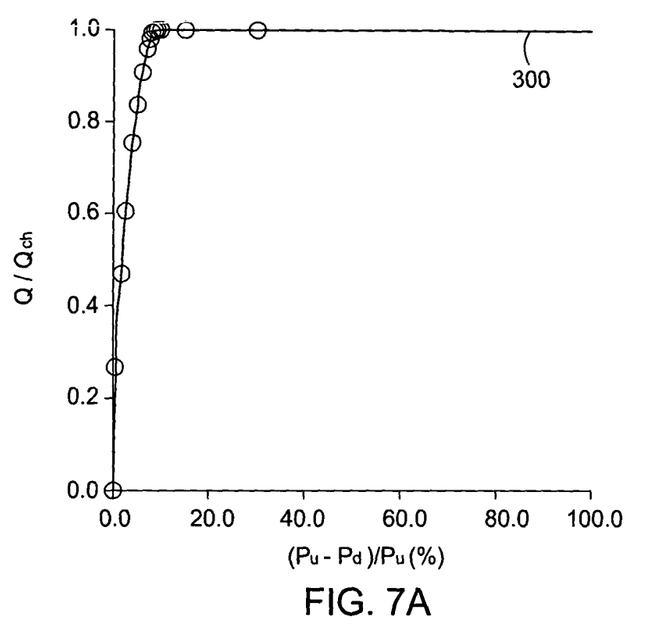
FIGS. 7A-C are graphs plotting the change of critical flow rate for varying throat areas in gas lift valves.

FIG. 7A shows critical flow characteristics of the present venturi nozzle valve at a specified throat area. In the Figure, flow rate is shown on the Y axis and pressure differential is shown on the X axis. As illustrated, the critical flow condition can be achieved at 10% or higher of pressure differential (shown by line 300).

Figure 7B:
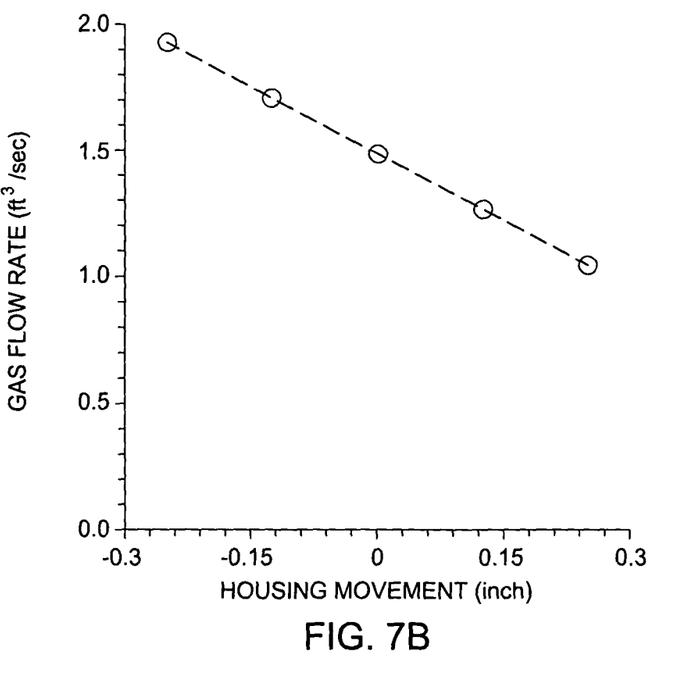

FIG. 7B shows how the critical flow rate typically varies as the throat area changes with the relative position of the plug and housing. The horizontal axis shows movement of the housing relative to the plug with "0" being the neutral position described herein. The vertical axis shows the corresponding changes in flow rate.

Figure 7C:
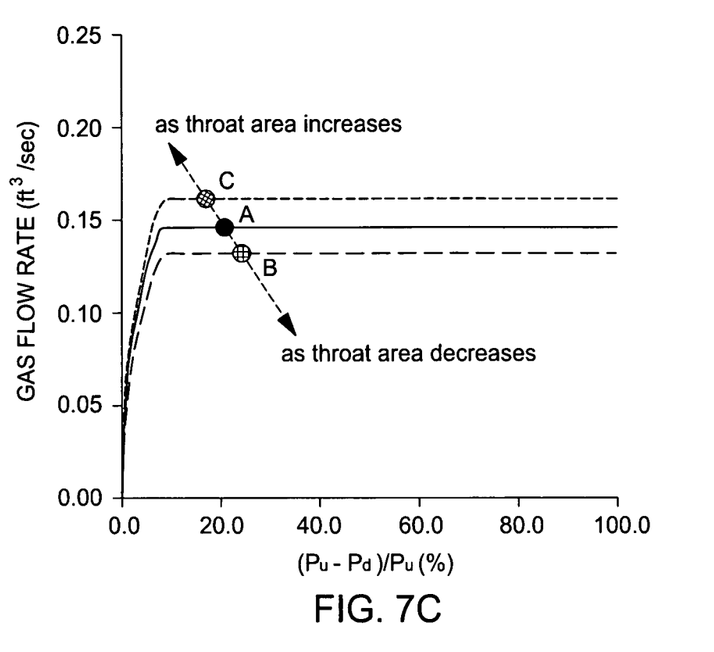

FIG. 7C is the combination of FIG. 7A and FIG. 7B representing the typical behavior of the gas lift valve shown in FIG. 6. As production gas/oil ratio increases from the design production gas/oil ratio and the hydrostatic pressure in production string decreases, the spring mechanism automatically compresses, moves the housing downwards in relation to the plug, thereby creating a smaller throat area. FIG. 7C shows an operating point moving from a neutral point A toward point B, thereby compensating for a pressure fluctuation by decreasing the injection gas rate. The inverse movement occurs toward point C when the production gas/oil ratio decreases to increase the gas injection rate. This self-adjusting gas injection rate of the present invention is not achievable from the earlier venturi having a fixed geometry.

The embodiments of the invention illustrated and discussed above teach a venturi valve with a self adjusting feature to change the volume of gas or steam passing through a valve at a critical flow rate. In some instances, the valve self adjusts due to natural conditions and in other instances an operation can cause the valve to shift effecting a change in pressure differential across the valve.

Figure 8A:
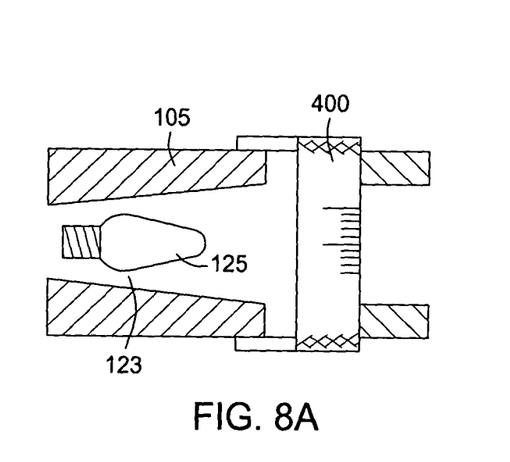
FIGS. 8A-C are section views of a venturi valve of the present invention adjustable by manual setting of knob.
Figure 8B:
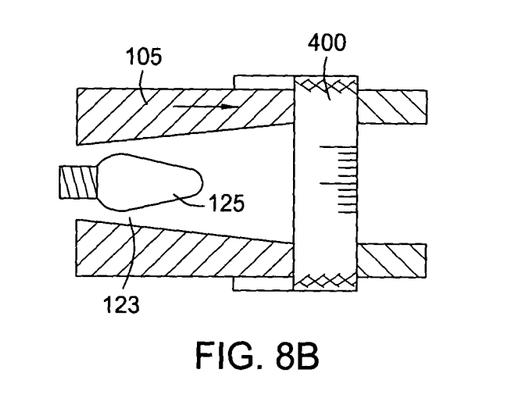
Figure 8C:
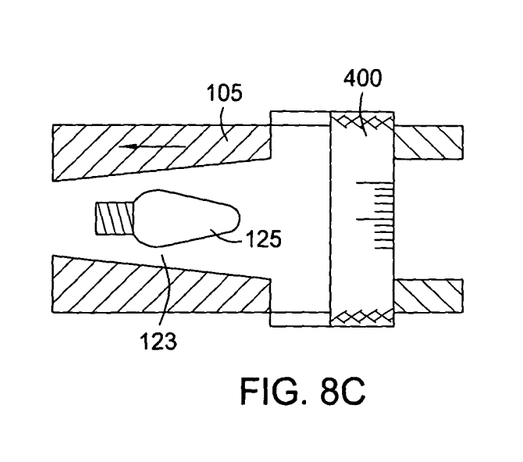
Figure 9:
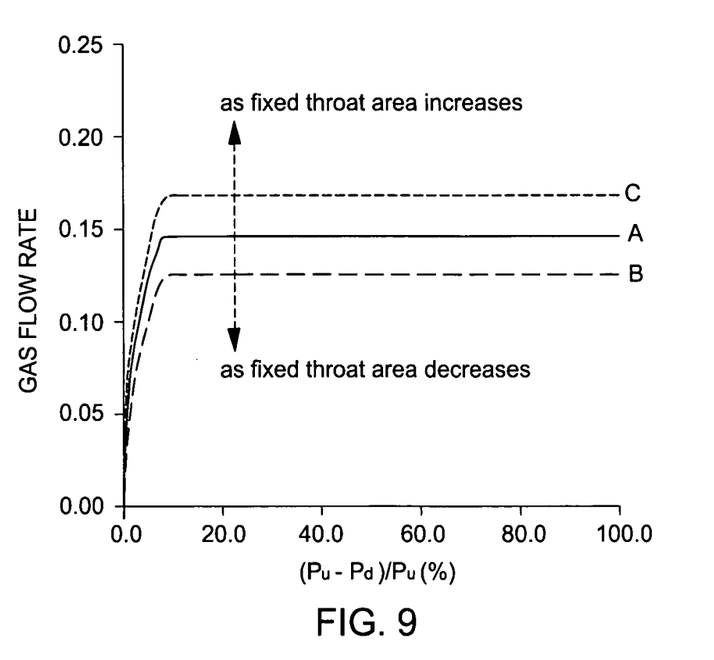
FIG. 9 is a graph plotting the change of critical flow rate for selection of a fixed throat area in the manual change of prescribed setting.

In other occasions, a manually adjustable embodiment may be achieved as illustrated in FIGS. 8A-C. By adjusting the knob 400, the relative position of plug 125 and housing 105 may be set, allowing the appropriate variation of throat area 123. As a result, as demonstrated in FIG. 9, a single venturi valve may operate at different choked critical flow regimes depending on the prescribed throat setting as shown by the letters A, B, and C for settings represented by FIGS. 8A-C, respectively.

Likewise, an adjustment can selectively be made from a remote location with the use of control devices like fluid or electrical power. For instance, a servo could be used to operate and shift the components or a hydraulic means could be incorporated to move one component relative to another.

While the foregoing is directed to embodiments of the present invention, other and further embodiments of the invention and utilization of invention in fields other than wellbores may be devised without departing from the basic scope thereof, and the scope thereof is determined by the claims that follow.

The invention claimed is:

1. A steam injection valve for use in a wellbore, comprising:
   a mandrel having a wall and a longitudinal bore; and
   a valve assembly coupled to the mandrel, eccentrically disposed relative to a centerline of the mandrel bore, and comprising:
      an inlet port in fluid communication with the mandrel bore;
      an outlet port in fluid communication an exterior of the steam injection valve;
      a housing having a wall and a longitudinal bore, the housing wall having an inner surface;
      a plug disposed in the housing bore, the plug having an outer surface;
      a venturi flow path formed between the inner and outer surfaces,
   wherein:
      one of the plug and the housing are longitudinally moveable relative to the other of the plug and the housing between:
         a first position where a throat of the venturi flow path has a first area, and
         a second position where the throat has a second area which is larger than the first area, and
      movement from the first position to the second position is in response to a first pressure differential between the inlet and outlet ports,
      the first pressure differential is defined as inlet pressure minus outlet pressure, and
      movement from the second position to the first position is in response to a second pressure differential between the inlet and outlet ports which is less than the first pressure differential; and
      a biasing member biasing the housing toward the first position if the housing is the movable one or the plug toward the second position if the plug is the moveable one.

2. The valve of claim 1, wherein the biasing member is a spring.

3. The valve of claim 1, wherein the venturi flow path has a converging inlet, a throat, and a diverging outlet.

4. The valve of claim 1, wherein the housing wall has a linearly tapered inner surface.

5. The valve of claim 1, wherein the mandrel has a pocket formed therein adjacent to the mandrel bore and the valve assembly is disposed in the pocket.

6. The valve of claim 1, wherein the movable one of the plug and the housing is pressure operated.

7. The valve of claim 1, wherein the first area is greater than zero and the second pressure differential is sufficient for critical flow through the throat.

* * * * *